United States Patent [19]

Sokolovsky

[11] Patent Number: 5,094,710
[45] Date of Patent: Mar. 10, 1992

[54] TAPE DISPENSER FOR TAPING 90≧ BOX CORNERS

[75] Inventor: Paul J. Sokolovsky, Sunnyvale, Calif.

[73] Assignee: Advanced Micro Devices, Inc., Sunnyvale, Calif.

[21] Appl. No.: 518,395

[22] Filed: May 3, 1990

[51] Int. Cl.$^5$ .............................................. B31F 5/08
[52] U.S. Cl. .................................. 156/463; 156/461; 156/468; 156/523; 156/530; 156/577; 156/579
[58] Field of Search ............... 156/577, 461, 463, 468, 156/523, 579, 530, 475

[56] References Cited

U.S. PATENT DOCUMENTS

| | | | |
|---|---|---|---|
| 2,339,235 | 1/1944 | Allen | 156/579 X |
| 2,468,619 | 4/1949 | Franke | 156/530 |
| 3,135,644 | 6/1964 | Coplen et al. | 156/461 X |
| 3,236,716 | 2/1966 | Loveland et al. | 156/468 |
| 4,174,246 | 11/1979 | Ralston | 156/577 X |
| 4,211,598 | 7/1980 | Diegel | 156/579 X |
| 4,732,644 | 3/1988 | Chin | 156/468 |
| 4,750,968 | 6/1988 | Sweeny | 156/577 X |
| 5,025,608 | 6/1991 | Marchetti | 156/523 X |

Primary Examiner—Michael W. Ball
Assistant Examiner—Mark A. Osele
Attorney, Agent, or Firm—Davis Chin

[57] ABSTRACT

A tape dispenser for taping 90° box corners includes a housing (12-20) for supporting a roll of tape to be dispensed therein, a first guiding member (30) for aligning the tape from the roll along the 90° box corner to dispense a predetermined length of tape from the roll, a second guiding member (32, 34) for guiding initially the tape onto each side surface of the box forming the 90° corner, and a third guiding member (42) for subsequently applying the tape onto the side surfaces of the box. A pair of blade carrying brackets (52, 54) is mounted for reciprocating vertical movement relative to the housing. A holder (58) is provided for receiving the blade carrying brackets for the reciprocating vertical movement therein. A cutting blade (56) is mounted to the lower ends of the blade carrying brackets. A cam actuating mechanism (76) is used to drive the blade carrying brackets downwardly to cause the blade to cut the tape which has been dispensed to the predetermined length.

20 Claims, 4 Drawing Sheets

TAPE DISPENSER FOR TAPING 90≧ BOX CORNERS

BACKGROUND OF THE INVENTION

This invention relates generally to tape dispensers and more particularly, it relates to a tape dispenser which includes unique guiding and forming components for facilitating the taping operation to be performed on 90° box corners.

Heretofore, the operation of applying tape onto the 90° corners of a box or container was achieved manually. Thus, this taping operation was generally a time-consuming task. Accordingly, there has arisen a need to provide a tape dispenser which reduces significantly the amount of time and effort required in the taping operation associated with the 90° corners of a box.

Applicant is unaware of any known tape dispensers available for carrying out the taping operation on the 90° box corners in an efficient and effective manner. The present invention provides a tape dispenser which includes a first guide member for aligning the tape from the roll along the 90° box corner to dispense a predetermined length of tape from the roll, a second guide member for guiding initially the tape dispenser onto each side surface of the box forming the 90° corner, and a third guide member for subsequently applying the tape onto the side surfaces of the box.

SUMMARY OF THE INVENTION

Accordingly, it is a general object of the present invention to provide a tape dispenser which includes unique guiding and forming components for facilitating the taping operation to be performed on 90° box corners.

It is an object of the present invention to provide a tape dispenser which reduces significantly the amount of time and effort required in the taping operation associated with the 90° corners of a box.

It is another object of the present invention to provide a tape dispenser which includes a first guide member for aligning the tape from the roll along the 90° box corner to dispense a predetermined length of the tape from the roll, a second guide member for guiding initially the tape dispenser onto each side surface of the box forming the 90° corner, and a third guide member for subsequently applying the tape onto the side surfaces of the box.

It is still another object of the present invention to provide a tape dispenser which includes an attachment plate for retaining fixedly the tape against a feed roller so as to prevent unwinding of the tape prior to cutting of the same.

In accordance with these aims and objectives, the present invention is concerned with the provision of a tape dispenser for taping 90° box corners which includes a housing for supporting a roll of tape to be dispensed therein, a first guide member mounted on a lower end of the housing for aligning the tape from the roll in its direction of travel along the 90° box corner to dispense a predetermined length of tape from the roll, a second guide member mounted upstream of the first guide member for guiding initially the tape dispenser onto each side surface of the box forming the 90° corner, and a third guide member mounted downstream of the first guide member and below the housing for subsequently applying the tape onto the side surfaces of the box. A blade carrying bracket is reciprocally mounted for vertical movement relative to the housing. A holding member receives the blade carrying bracket for the reciprocating vertical movement therein. A cutting blade is mounted to the lower end of the blade carrying bracket. A cam actuating mechanism is used to drive the blade carrying bracket downwardly to cause the blade to cut the tape which has been dispensed to the predetermined length.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 1:
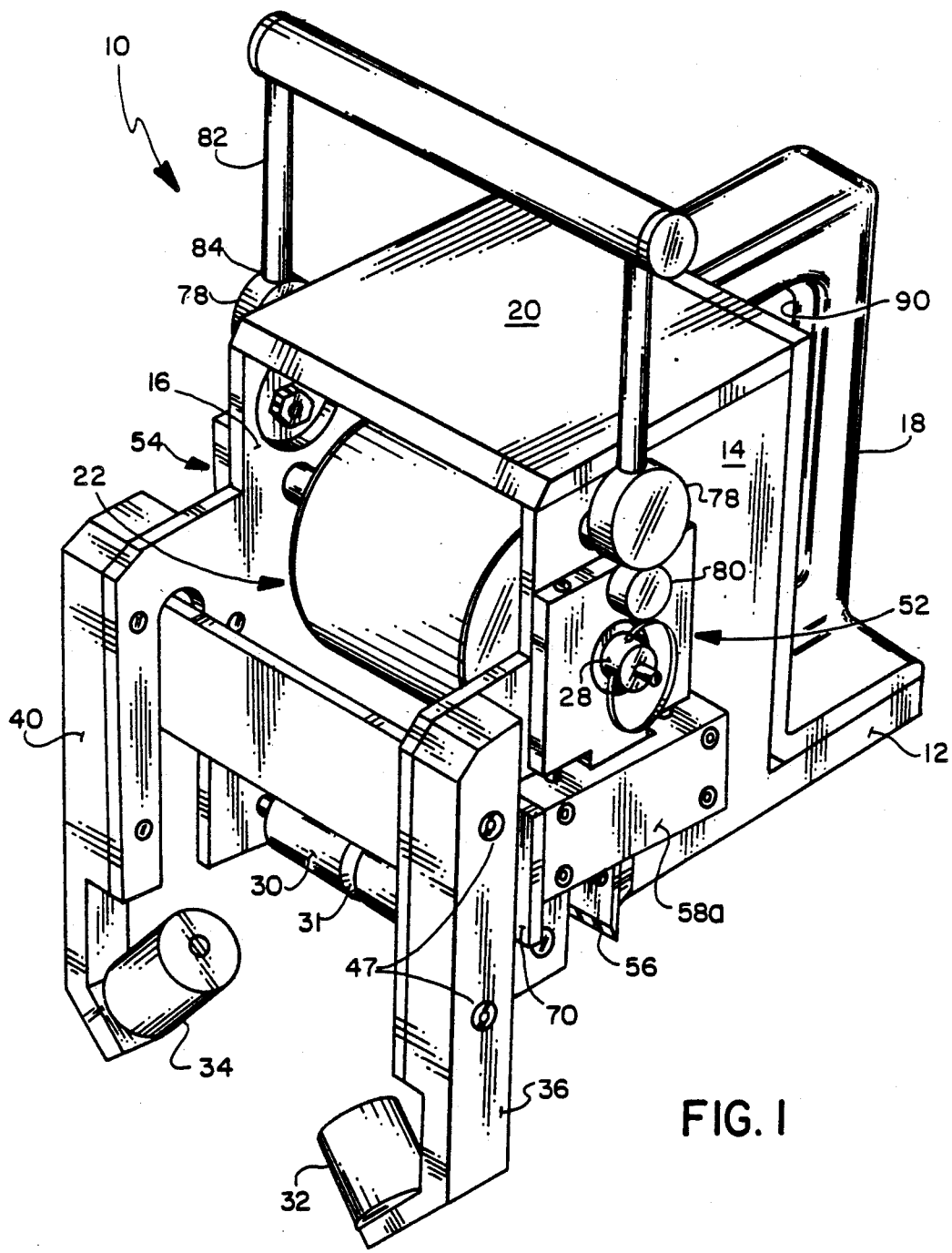
FIG. 1 is a perspective view of a tape dispenser, constructed in accordance with the principles of the present invention.

Referring now in detail to the various views of the drawings and particularly to FIGS. 1-4, there is illustrated a tape dispenser 10 which facilitates the taping operation to be performed on 90° box corners, constructed in accordance with the principles of the present invention. The tape dispenser 10 includes a housing formed of a base plate member 12, left and right side plate members 14, 16, a handle member 18, and a top plate member 20. The left and right side plate members 14 and 16 are mounted on top of the base plate 12 in a spaced apart relationship. The handle member 18 is suitably joined to the rear side of the respective left and right side plate members 14, 16 and is mounted on top of the base plate 12. The top plate 20 connects the top edges of the left and right side plate members together. The housing is open at its front side with opening 22 for receiving a roll 24 of tape to be dispensed. The roll 24 is held rotatably in the opening 22 by bushings 26 received in the respective side plates 14, 16 for receiving a ring retaining pin 28 extending therethrough.

A first guiding member formed of a feed roller 30 is mounted between the lower ends of the side plate members 14, 16 at the lower end of the housing. The feed roller 30 is formed with a 90° recess 31 in its intermediate area which is used to align symmetrically the tape being dispensed with the 90° corners of the box so as to dispense a predetermined length of tape from the roll in its direction of travel. A second guide member is formed of a pair of angularly positioned guide rollers 32, 34 mounted upstream or in front of the feed roller 30. The guide rollers 32, 34 are utilized to guide initially the tape dispenser onto each side surface of the box forming the 90° corner. Each of the guide rolls has its axis disposed at a 45° angle to the horizontal plane of the axis of the feed roller 30. Thus, there is formed a 90° angle between the axes of the two guide rollers 32 and 34.

The shaft of the guide roller 32 is mounted on a vertical front end bracket 36, and the shaft of the guide roller 34 is mounted on a vertical front end bracket 40. The end brackets 36 and 40 are suitably joined via screws 47 to the front ends of the left and right side plate members 14, 16 respectively. In this manner, the guide rollers 32, 34 serve to maintain the tape being dispensed to travel along the apex of the 90° corner on the box. As can be seen, the guide rollers 32, 34 are mounted in front of the feed roller 30.

Figure 2:
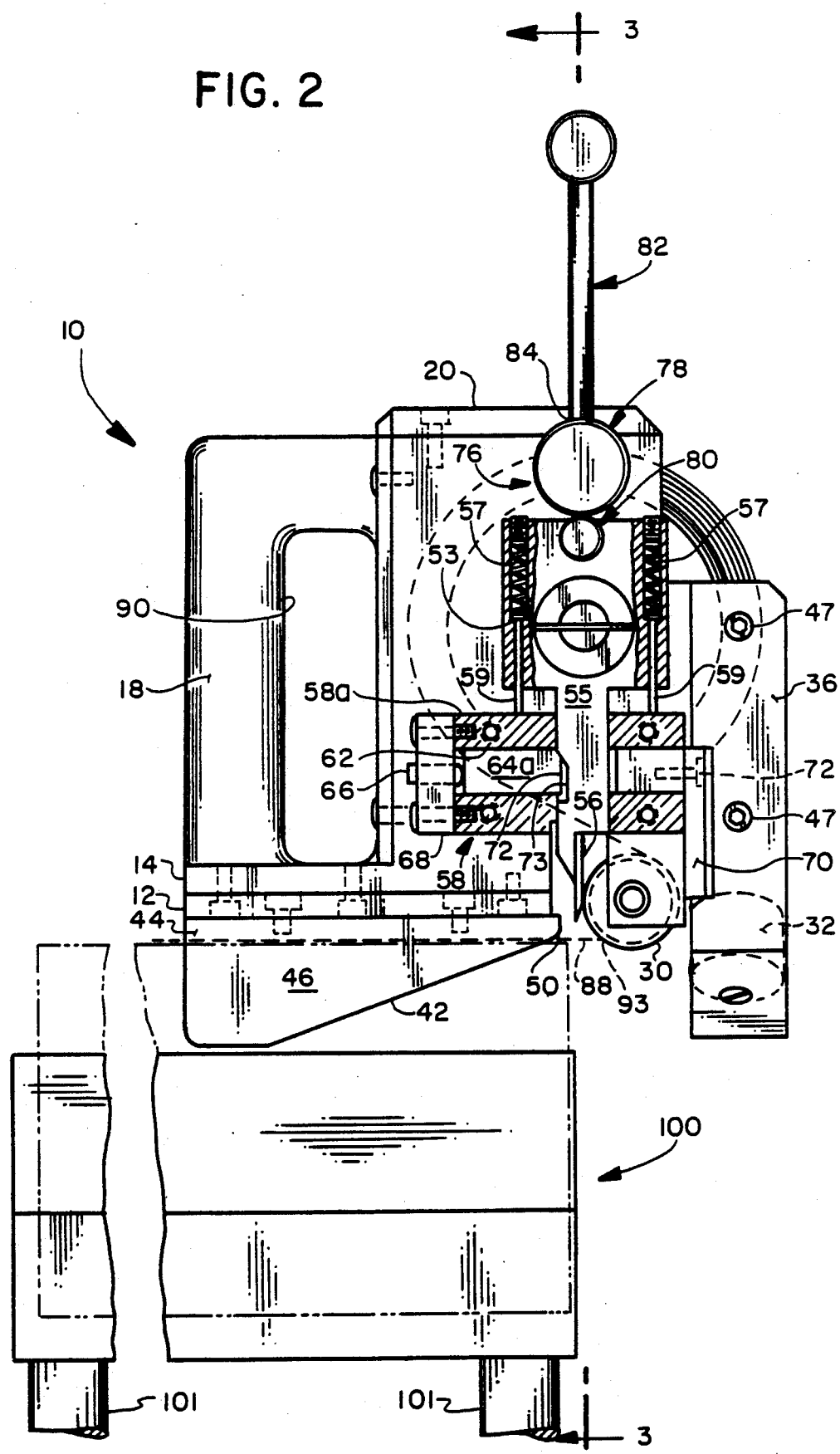
FIG. 2 is a side elevational view of the tape dispenser of FIG. 1.
Figure 5:
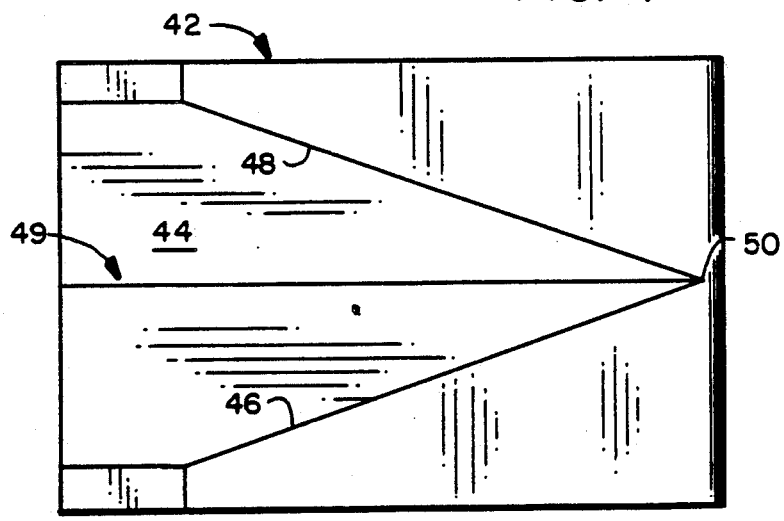
FIG. 5 is a bottom plan view of the tapered guiding bracket 42.
Figure 6:
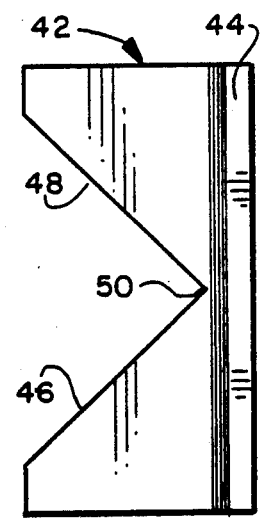
FIG. 6 is an end view of the tapered guiding bracket 42.

A third guiding member formed of a tapered guiding bracket 42 is mounted downstream or to the rear of the feed roller 30 and below the housing base plate 12 for subsequently applying gradually the tape onto the surfaces of the box so as to provide a smooth and easy spreading of the tape. The guiding bracket 42 includes a top flat plate member 44 and a pair of triangularly-shaped side plate members 46, 48 each being joined at a 45° angle to the horizontal plane of the longitudinal axis 49 of the top plate 44. The triangularly-shaped plates 46, 48 are further disposed angularly to the vertical plane of the longitudinal axis of the top plate and joined at their one end 50 adjacent the center of the housing and then diverges outwardly in the direction toward the rear of the housing. The guiding bracket 42 is best illustrated in FIGS. 2, 5 and 6.

Blade carrying brackets 52, 54 each have a rectangularly-shaped upper portion 53 and a narrow vertical lower portion 55. The upper portion 53 houses a pair of return springs 57 which engage one end of plunger rods or pins 59. A cutting blade 56 is fixedly mounted between the blade carrying brackets 52, 54 along its lower ends thereof. A bracket holder 58 is formed of two symmetrical plate members 58a, 58b having a vertical channel 60 therein in which the blade carrying brackets reciprocate. The bracket holder 58 is also formed with a horizontal channel 62 for receiving slidably therein left and right slide plate members 64a, 64b.

One end of the side plate members 64a and 64b engage a spring-loaded plunger 66 which is received in an end plate 68 mounted to the bracket holder 58. An attachment plate 70 is fixed securely to the other ends of the slide plate members 64a and 64b via screws 72. The vertical lower portion 55 of the plate carrying brackets 52, 54 and the slide plate members 64a, 64b are provided with respective cooperating cam surfaces 73, 74. The pins 59 are used to support the upper portions 53 of the blade carrying brackets 52, 54 for vertical movement above the bracket holder 58.

In order to reciprocate the blade carrying bracket 58 in the vertical channel 60, there is provided a cam actuating mechanism 76 consisting of cam members 78, cam followers 80, and a handle 82. The handle 82 is connected to the cam members 78 at points 84. A reduced portion 86 of the cam members is rotatably connected to the respective side plates 14, 16 of the housing via bearings 87. The cam followers 80 are fixedly secured to the upper ends of the blade carrying brackets 52, 54 via openings 89. Thus, the blade carrying brackets are mounted for reciprocating vertical movement through a distance X relative to the housing side plates.

Figure 3:
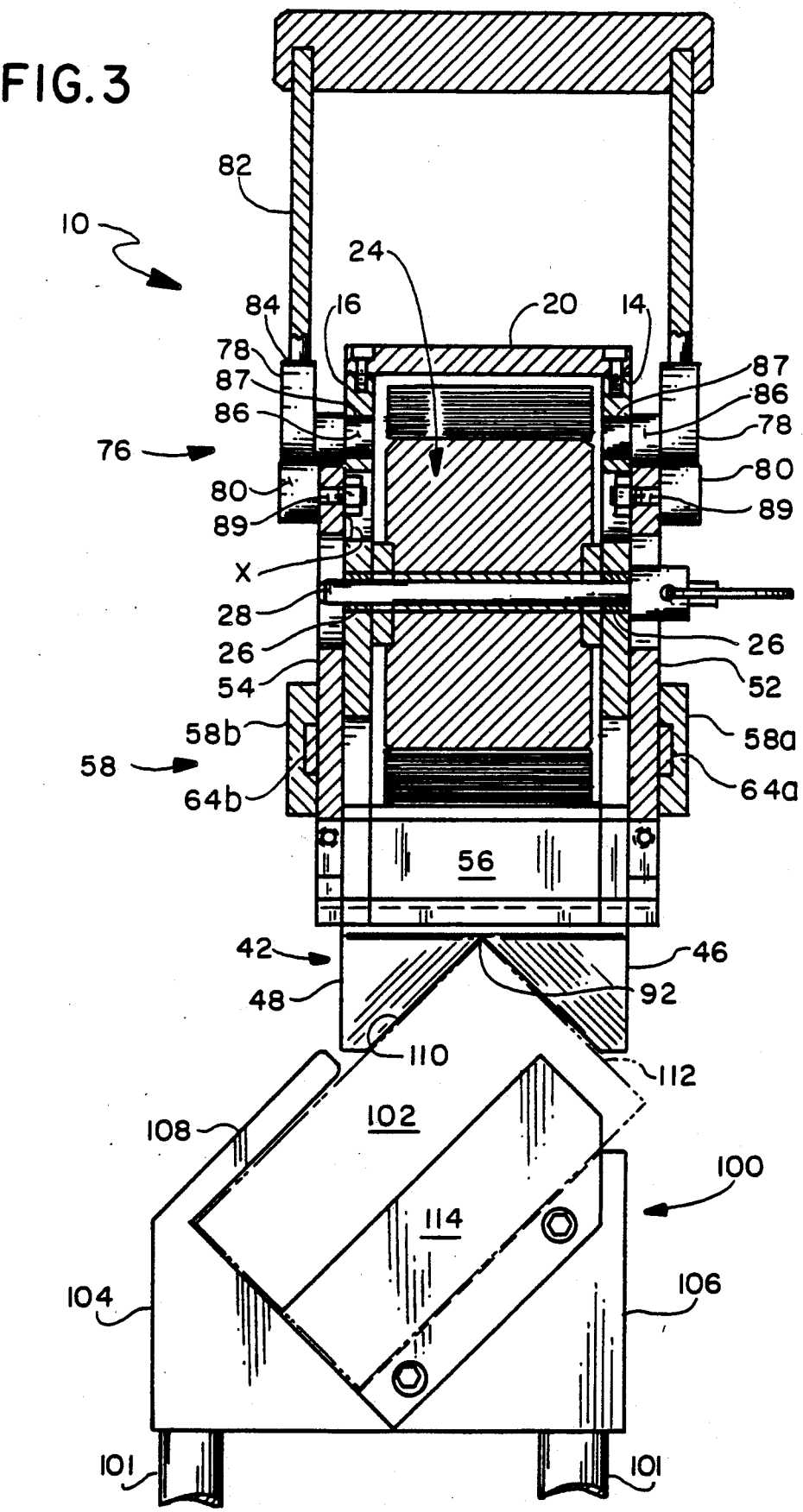
FIG. 3 is a cross-sectional view, taken along the lines 3—3 of FIG. 2.
Figure 4:
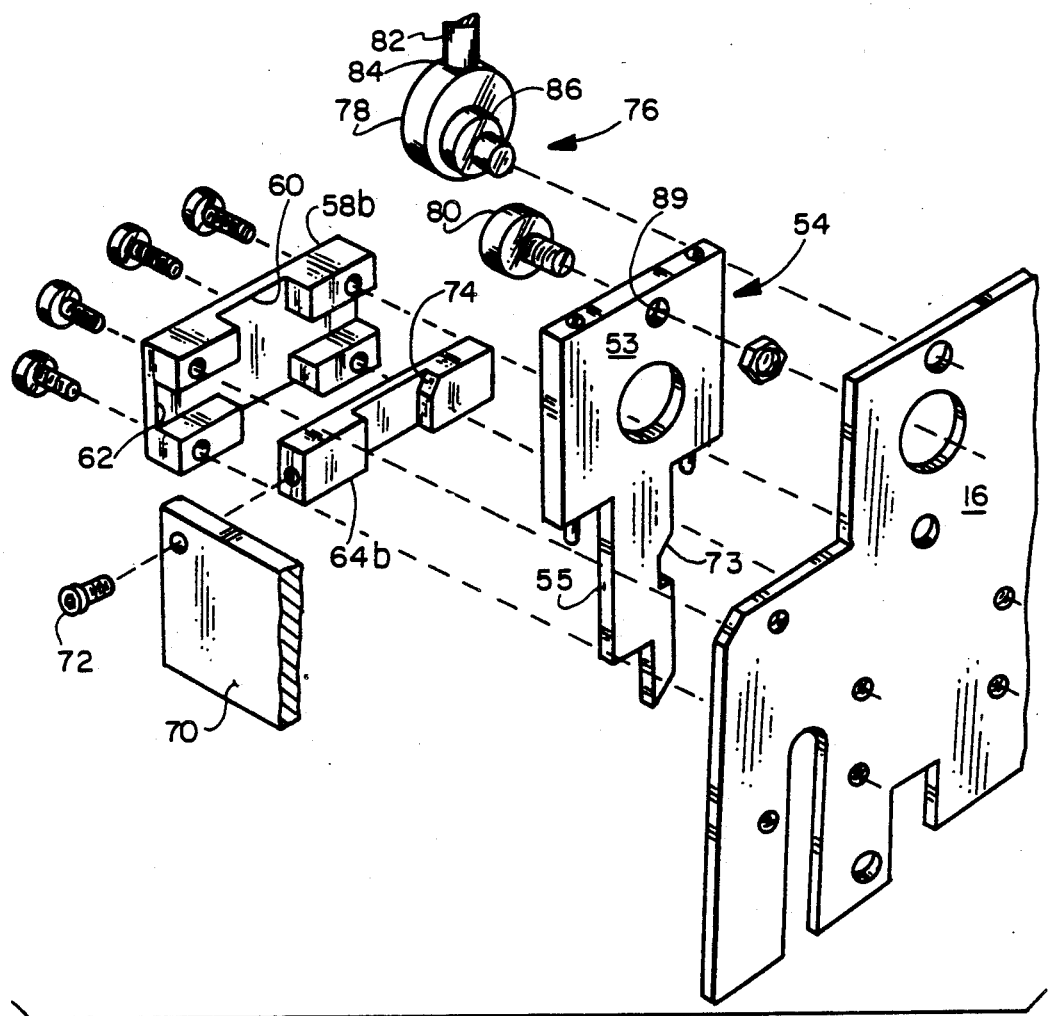
FIG. 4 is an exploded perspective view of a side portion of the tape dispenser, illustrating the cam actuating mechanism 76, bracket holder 58b, and side plate 64b.

The operation of the tape dispenser of the present invention will now be described. In order to withdraw the tape from the dispenser, the free end 88 of the tape is unrolled from the roll 24 and is then moved downwardly between the feed roller 30 and the attachment plate 70, and underneath the feed roller 30, as illustrated in FIG. 2. In this position, the operator can grasp the handle member 18 by the opening 90 formed therein and place initially the free end of the tape and the recess 31 of the feed roller into alignment with the 90° box corner at apex 92, as shown in FIG. 3. The tape may be freely unwound from the roll 24 as the dispenser is being pushed along the apex 92 of the 90° box corner to be taped. The guide roller 32, 34 serves to guide the dispenser along the apex. Further, the tapered guiding bracket 42 will gradually spread the adhesive side 93 of the tape onto the side surfaces of the box forming the 90° corner.

When the desired length of tape has been withdrawn, the actuating handle 82 is pulled down or rotated clockwise or counter-clockwise so as to cause the cam members 78 to rotate. As a result, the cam followers 80 are pushed downwardly so as to compress the return springs 57 in the blade carrying brackets 52, 54 and to cause the lower portion 55 to reciprocate in the vertical channel 60 of the bracket holder 58. Due to the interaction of the cam surfaces 73 on the vertical section 55 of the blade carrying brackets 52, 54 and the cam surfaces 74 on the side plates 64a, 64b, the slide plates and attachment plate 70 are caused to move to the left against the spring-loaded plunger 66 (as seen from FIG. 2) so as to pinch or hold firmly the tape with a proper degree of tension between the feed roller 30 and the attachment plate 70. In this manner, the tape is prevented from unwinding from its roll prior to the cutting off of the predetermined length of tape. When the downward force on the blade carrying brackets is further increased, the tape is cut or severed by the cutting blade 56 which is mounted to the lower end of the blade carrying brackets.

After cutting, the actuating handle 82 is released. This has the effect of allowing the spring-loaded plunger 66 to force the slide plates 64a, 64b to move to the right. The blade carrying brackets 52, 54 will reciprocate upwardly in the vertical channel 60 so as to return the same to its original position due to the decompression of the return springs 57.

As can best be seen from FIG. 3, there is shown a frame structure 100 having legs 101 used in connection with the tape dispenser 10 of the present invention. The frame structure 100 is used to hold a box 102 in order to facilitate taping of the 90° box corners. The frame structure has a rectangularly-shaped configuration and has a front wall 104 and a rear wall 106. An inclined wall 108 is formed integrally with the front wall 104. The box is suitably positioned in the frame structure between the inclined wall 108 and the rear wall 106 with the one 90° corner 92 formed by the box surfaces 110 and 112 being exposed. The frame structure 100 also includes side plates 114 which are used to abut against the end surfaces of the box.

From the foregoing detailed description, it can thus be seen that the present invention provides a tape dispenser for facilitating the taping operation to be performed on 90° box corners. The tape dispenser includes a first guide member for aligning the tape from the roll along the 90° box corner to dispense a predetermined length of tape from the roll, a second guide member for guiding initially the tape dispenser onto each side surface of the box forming the 90° corner, and a third guide member for subsequently applying the tape onto the side surfaces of the box. Further, there are provided slide plate members and an attachment plate for retaining firmly the tape against a feed roller so as to prevent unwinding of the tape prior to cutting of the same.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A tape dispenser for taping 90° box corners, comprising:
    housing means (12-20) for supporting a roll of tape to be dispensed therein;
    first guiding means (30) mounted on a lower end of said housing means for aligning the tape from the roll in its direction of travel along the 90° box corner to dispense a predetermined length of tape from the roll;
    second guiding means (32,34) mounted upstream of said first guiding means for guiding initially the tape dispenser onto each side surface of the box forming the 90° corner;
    third guide means (42) mounted downstream of said first guiding means and below said housing means for subsequently applying the tape onto the side surfaces of the box;
    blade carrying bracket means (52, 54) mounted for reciprocating vertical movement relative to said housing means;
    holding means (58) receiving said bracket means for the reciprocating vertical movement therein;
    a cutting blade (56) mounted to a lower end of said bracket means; and
    cam actuating means (76) for driving said bracket means downwardly to cause said blade to cut the tape which has been dispensed to the predetermined length.

2. A tape dispenser as claimed in claim 1, further comprising a pair of slide plate members (64a, 64b) received in said holding means for retaining fixedly the tape against the first guide means so as to prevent unwinding of the tape prior to cutting of the tape.

3. A tape dispenser as claimed in claim 2, further comprising an attachment plate (70) fixed securely to one end of the pair of slide plate members.

4. A tape dispenser as claimed in claim 3, further comprising cooperating cam surfaces (73, 74) formed on said bracket means and said slide plate members for permitting sliding movement of said attachment plate against said first guide member means.

5. A tape dispenser as claimed in claim 1, wherein said first guiding means comprises a feed roller (30).

6. A tape dispenser as claimed in claim 5, wherein said feed roller is formed with a 90° recess (31) in its intermediate area which aligns symmetrically the tape being dispensed with the 90° box corner.

7. A tape dispenser as claimed in claim 1, wherein said second guiding means comprises a pair of guide rollers (32, 34) having their axes disposed at a 90° angle to each other.

8. A tape dispenser as claimed in claim 1, wherein said third guiding means comprises a tapered guiding bracket (42) formed of a base plate (44) and two triangularly-shaped side plates (46, 48) which are disposed angularly to the vertical plane of the longitudinal axis of the base plate.

9. A tape dispenser as claimed in claim 8, wherein said side plates are joined together at one of the ends at the center of the housing means and diverges outwardly from the center of the housing means.

10. A tape dispenser as claimed in claim 1, wherein said cam actuating means is comprised of cam members (78) and cam follower members (80), said cam follower members being fixedly secured to said blade carrying bracket means.

11. A tape dispenser as claimed in claim 2, wherein said holding means comprises a bracket holder (58) formed of two symmetrical plate members (58a, 58b) having a vertical channel (60) for receiving said blade carrying bracket means and a horizontal channel (62) for receiving said slide member means.

12. A tape dispenser for taping 90° box corners, comprising:
    housing means (12-20) for supporting a roll of tape to be dispensed therein;
    first guiding means (30) mounted on a lower end of said housing means for aligning the tape from the roll in its direction of travel along the 90° box corner to dispense a predetermined length of tape from the roll;
    second guiding means (32, 34) mounted upstream of said first guiding means for guiding initially the tape dispenser onto each side surface of the box forming the 90° corner;
    third guide means (42) mounted downstream of said first guiding means and below said housing means for subsequently applying the tape onto the side surfaces of the box;
    blade carrying bracket means (52, 54) mounted for reciprocating vertical movement relative to said housing means;
    holding means (58) receiving said bracket means for the reciprocating vertical movement therein;
    a cutting blade (56) mounted to a lower end of said bracket means;
    cam actuating means (76) for driving said bracket means downwardly to cause said blade to cut the tape which has been dispensed to the preferred length; and
    slide member means (64a, 64b) received in said holding means for retaining fixedly the tape against said first guide means so as to prevent unwinding of the tape prior to cutting of the tape.

13. A tape dispenser as claimed in claim 12, wherein said first guiding means comprises a feed roller (30).

14. A tape dispenser as claimed in claim 13, wherein said feed roller is formed with a 90° recess (31) in its intermediate area which aligns symmetrically the tape being dispensed with the 90° box corner.

15. A tape dispenser as claimed in claim 14, wherein said slide member means includes an attachment plate (70).

16. A tape dispenser as claimed in claim 15, further comprising cooperating cam surfaces (73, 74) formed on said bracket means and said slide member means for permitting sliding movement of said attachment plate against said first guide member means.

17. A tape dispenser as claimed in claim 16, wherein said second guiding means comprises a pair of guide rollers (32, 34) having their axes disposed at a 90° angle to each other.

18. A tape dispenser as claimed in claim 17, wherein said third guiding means comprises a tapered guiding bracket (42) formed of a base plate (44) and two triangularly-shaped side plates (46, 48) which are disposed angularly to the vertical plane of the longitudinal axis of the base plate.

19. A tape dispenser as claimed in claim 18, wherein said side plates are joined together at one of the ends at the center of the housing means and diverges outwardly from the center of the housing means.

20. A tape dispenser as claimed in claim 19, wherein said holding means comprises a bracket holder (58) formed of two symmetrical plate members (58a, 58b) having a vertical channel (60) for receiving said bracket means and a horizontal channel (62) for receiving said slide member means.

* * * * *